United States Patent [19]

Mondshine

[11] 4,192,756

[45] Mar. 11, 1980

[54] ANTICAKING OF SODIUM CHLORIDE AND POTASSIUM CHLORIDE

[75] Inventor: Thomas C. Mondshine, Houston, Tex.

[73] Assignee: Texas Brine Corporation, Houston, Tex.

[21] Appl. No.: 960,057

[22] Filed: Nov. 13, 1978

Related U.S. Application Data

[63] Continuation-in-part of Ser. No. 871,682, Jan. 23, 1978, abandoned.

[51] Int. Cl.$^2$ .............................................. C01D 3/26
[52] U.S. Cl. .............................. 252/8.55 R; 252/383; 252/384; 423/268
[58] Field of Search .............. 252/8.5 A, 8.55 R, 384, 252/383; 423/268

[56] References Cited

U.S. PATENT DOCUMENTS

| | | | |
|---|---|---|---|
| 1,793,420 | 2/1931 | Block | 252/383 X |
| 2,689,166 | 9/1954 | Rust et al. | 252/383 X |
| 2,721,840 | 10/1955 | Lee | 252/8.5 |
| 2,990,246 | 6/1961 | Scott et al. | 252/384 X |
| 3,388,990 | 6/1968 | Maruta et al. | 252/384 X |
| 3,675,717 | 7/1972 | Goins et al. | 166/278 |
| 3,953,335 | 4/1976 | Jackson | 252/8.5 |
| 4,025,443 | 5/1977 | Jackson | 252/8.5 |

*Primary Examiner*—Herbert B. Guynn
*Attorney, Agent, or Firm*—Jack W. Hayden

[57] ABSTRACT

Caking of potassium chloride and sodium chloride in the particle size range of 20 mesh and finer is inhibited by adding one or more alkaline earth or multi-valent metal salts of lignosulfonate in an amount by weight within the range of about 1% to about 20% to the potassium chloride or sodium chloride.

4 Claims, No Drawings

ANTICAKING OF SODIUM CHLORIDE AND POTASSIUM CHLORIDE

CROSS REFERENCE TO RELATED APPLICATION

This application is a continuation-in-part of my prior copending application Ser. No. 871,682 filed Jan. 23, 1978, now abandoned for "Anticaking of Sodium Chloride and Potassium Chloride".

SUMMARY OF THE INVENTION

Caking of ground salt in cartons, bags, or bulk is a common problem. The severity of the caking depends upon the particle size of the salt and the atmospheric conditions of temperature and humidity. The primary mechanism of caking involves fluctuations in atmospheric relative humidity. The critical humidity of sodium chloride is 75% relative humidity. Above this value, salt becomes deliquescent and attracts moisture to form a saturated brine on its crystal surfaces; then when atmospheric humidity drops below 75% the brine evaporates leaving a recrystallized weld between individual particles. The finer the salt the greater the caking tendency.

The resistance of salt to caking has heretofore been affected by adding agents such as tricalciumphosphate, sodium silico aluminate, and yellow prussiate of soda; but these anticaking agents have limited effectiveness in extremely fine salt ground to particle size finer than 74 micron such as 200 mesh or 325 mesh material.

I have discovered that certain powdered lignosulfonates are effective anti-caking agents for finely ground sodium and potassium chloride. Powdered salt containing from 1 to 20% by weight of one or more multi-valent lignosulfonates have excellent resistance to caking. I have also discovered that such lignosulfonates can be used in conjunction with other anti-caking agents to improve the resistance of salt to caking.

OBJECT OF THE INVENTION

An object of the present invention is to provide a composition of matter consisting of one or both of the group consisting of sodium chloride and potassium chloride in an amount by weight of about 80% to about 99% and one or more of the metal salts of lignosulfonate formed from the group consisting of alkaline earth metals or other multi-valent metals such as, by way of example only, calcium, iron, chromium, zinc, copper, ferro chrome and magnesium, and wherein the particle size of the sodium and potassium chloride is 20 mesh and finer.

An object of the present invention is to provide a composition of matter consisting of one or both of the group consisting of sodium chloride and potassium chloride in an amount by weight of about 80% to about 99% and one or more of the metal salts of lignosulfonate formed from the group consisting of alkaline earth metals or other multi-valent metals such as, by way of example only, calcium, iron, chromium, zinc, copper, magnesium, and ferro chrome and wherein the particle size of the sodium and potassium chloride is 20 mesh and finer, and wherein an alkali metal hydroxide or salt or an alkaline earth metal oxide or hydroxide is added to maintain the pH about 7.

DESCRIPTION OF THE PREFERRED EMBODIMENT

Commonly used salt anti-caking additives include tricalcium phosphate, sodium silico aluminate, yellow prussiate of soda and calcium polysilicate. However, while these materials function suitably for relatively coarse salt, they have limited effectiveness in extra fine salts, such as 20 mesh and finer when exposed to extremely high humidities.

In some instances sodium chloride or potassium chloride is packaged and stored for substantial periods of time, thus subjecting the potassium and sodium chloride to varying temperatures and humidities. In those instances where it is desired to use the sodium chloride or potassium chloride in cattle feed, fertilizer or as an additive in well completion fluids, it is generally desirable that the sodium and potassium chloride be in the range of 20 mesh and finer.

When the salt is in this particle size range, it is subject to severe caking problems when exposed to varying temperature and humidity conditions so that it cannot be readily employed in the desired environment prior to further treatment.

I have discovered that when one or more of the metal salts of lignosulfonate formed from the group consisting of alkali earth metals or other multi-valent metals such as calcium, iron, chromium, ferro chrome, zinc, copper and magnesium is added to the sodium chloride or potassium chloride, the tendency to cake is substantially reduced, even over extended periods of storage and warehousing in cartons, bags or bulk. More particularly, I have discovered that the metals salts of lignosulfonate aforementioned may be added in a range of about 1% to about 20% by weight to the sodium chloride or potassium chloride to substantially reduce, if not completely eliminate the problems attendant with caking of these substances under severe humidity and temperature conditions that may be encountered.

Specifically, the anti-caking agent used in this invention is a metallic sulfonated salt of lignin which is the binding agent in wood. Lignin is removed from wood by rendering it soluble by the process of sulfonating it with sulphurous acid and one of its soluble salts. This soluble fraction is then separated from the insoluble cellulose fibers and processed independently to produce the desired metallic salt.

Examples of commercially available lignosulfonates suitable for use include Toranil B, made by St. Regis Paper Company and Lignosite A, made by Georgia-Pacific Corporation.

The exact molecular structure of lignin has not been determined, but it is generally conceded to be a mixture of polymers of guaiacyl propone, molecular weight varies between 1,000 and 20,000 averaging about 10,000.

As a practical matter, the lignosulfonate of the present invention may be employed in sodium chloride and potassium chloride in any situation where the presence of the lignosulfonate does not interfere with the end use of the sodium chloride or potassium chloride.

The following tests demonstrate the utility of the present invention and also illustrate by comparison with certain alkali metal lignosulfonates that the alkali metal lignosulfonates are unsatisfactory in the present invention.

SALT CAKING TESTS
A COMPARISON OF VARIOUS LIGNOSULFONATE DERIVATIVES

PROCEDURE: Finely ground salt (100% thru 325 mesh) samples were treated separately with 5% by weight of various lignosulfonate derivatives. Samples were exposed to 75% humidity for 16 hours. The individual samples were subjected to storage tests under loads and temperature comparable to severe warehouse conditions. After four days the samples were examined for caking tendencies.

TEST RESULTS

| Samples Description | Condition After Storage |
| --- | --- |
| Untreated salt | Moderately caked (difficult to break up) |
| Salt treated with 5% by weight calcium lignosulfonate | Non-caked |
| Salt treated with 5% by weight sodium lignosulfonate | Severely caked |
| Salt treated with 5% by weight potassium lignosulfonate | Severely caked |
| Salt treated with 5% by weight sodium-calcium lignosulfonate | Moderately caked (difficult to break up) |
| Salt treated with 5% by weight chrome lignosultonate | Slightly caked (easily broken-up) |
| Salt treated with 5% by weight ferro-chrome lignosulfonate | Slightly caked (easily broken-up) |

CONCLUSION: Alkali metal lignosulfonates are not effective anti-caking additives for finely ground salt. The tests show that these materials can accelerate caking tendency by acting as binder.

Alkaline earth metal lignosulfonates and other multivalent metal lignosulfonates are effective anti-caking additives for sodium and potassium salt. Calcium lignosulfonate exhibited the best anti-caking ability of the materials tested.

Additionally, where the end use of the sodium chloride or potassium chloride requires a neutral or alkaline pH such as in oilfield work over and completion fluids, such as described in the article "Completion Fluid uses Salts for Bridging, Weighting," in the Oil and Gas Journal of Aug. 22, 1977 by T. C. Mondshine, a small amount of an alkali metal salt or hydroxide such as sodium carbonate, sodium hydroxide, potassium hydroxide, lithium hydroxide, rubidium hydroxide and cesium hydroxide, or an alkaline earth metal oxide or hydroxide such as calcium oxide, magnesium oxide, calcium hydroxide, magnesium hydroxide, barium hydroxide and strontium hydroxide may be incorporated to neutralize the acidity of the lignosulfonate. It can be appreciated that other alkali metal salts and other alkaline earth metal salts may be employed and the foregoing is by way of example only. Generally speaking, any alkaline substance that raises the pH and which does not interfere with the end use of the product may be employed to raise the pH.

What is claimed is:

1. As a composition of matter having resistance to caking:
    a. one or both of the group consisting of sodium chloride and potassium chloride having a particle size of 20 mesh and finer in an amount by weight of about 80% to about 99%; and
    b. one or more metal lignosulfonate salts in an amount by weight of about 1% to about 20% said metal being selected from the group consisting of calcium, iron, ferro-chrome, chromium, zinc, copper and magnesium .

2. The invention of claim 1 wherein alkaline substance is included to maintain the pH about 7.

3. A method of inhibiting the caking of sodium and potassium chloride in the particle size range of 20 mesh and finer for use in well completion fluids including adding one or more metal lignosulfonate salts, in an amount by weight of about 1% to about 20% to the sodium and potassium chloride to form a mixture said metal being selected from the group consisting of calcium, iron, ferro-chrome, chromium, zinc, copper and magnesium.

4. The invention of claim 3 wherein an alkaline substance is added to maintain the pH of the mixture about 7.

* * * * *